United States Patent
Itzov

Patent Number: 5,937,720
Date of Patent: Aug. 17, 1999

[54] LOWER BLADE GUARD ACTUATING MECHANISM FOR A SLIDE COMPOUND MITER SAW

[75] Inventor: Andrew L. Itzov, Menomonee Falls, Wis.

[73] Assignee: Milwaukee Electric Tool Corporation, Brookfield, Wis.

[21] Appl. No.: 08/688,309

[22] Filed: Jul. 30, 1996

Related U.S. Application Data

[60] Provisional application No. 60/002,134, Aug. 10, 1995.

[51] Int. Cl.⁶ .............................. B23D 45/14; B26D 5/00; B27G 19/02
[52] U.S. Cl. .......................... 83/397; 83/478; 83/DIG. 1; 83/490; 83/471.3
[58] Field of Search ................... 83/581, 471.3, 83/483, 472, 477.1, 486, 486.1, 488, 489, 490, 397, 481, 478, DIG. 1, 588, 589

[56] References Cited

U.S. PATENT DOCUMENTS

| | | | |
|---|---|---|---|
| D. 306,031 | 2/1990 | Ushiwata et al. | D15/133 |
| 4,163,404 | 8/1979 | Lavis | 83/165 |
| 4,202,233 | 5/1980 | Larson | 83/745 |
| 4,300,426 | 11/1981 | Weaver | 83/471.3 |
| 4,335,637 | 6/1982 | Kaltenbach | 83/452 |
| 4,343,213 | 8/1982 | Drixler | 83/490 X |
| 4,537,105 | 8/1985 | Bergler | 83/471.3 |
| 4,559,857 | 12/1985 | Grossmann et al. | 83/471.3 |
| 4,581,966 | 4/1986 | Kaiser et al. | 83/490 X |
| 4,587,875 | 5/1986 | Deley | 83/471.3 |
| 4,774,866 | 10/1988 | Dehari et al. | 83/490 X |
| 4,799,416 | 1/1989 | Kumasaka et al. | 83/397 |
| 4,805,504 | 2/1989 | Fushiya et al. | 83/490 X |
| 4,817,581 | 4/1989 | Trentadue | 83/486 X |
| 4,869,142 | 9/1989 | Sato et al. | 83/467.1 |
| 4,934,233 | 6/1990 | Brundage et al. | 83/397 |
| 5,020,406 | 6/1991 | Sasaki et al. | 83/397 |
| 5,054,352 | 10/1991 | Fushiya et al. | 83/468.3 |
| 5,060,548 | 10/1991 | Sato et al. | 83/471.3 |
| 5,146,825 | 9/1992 | Dehari | 83/397 |
| 5,146,826 | 9/1992 | Shiotani et al. | 83/468.2 |
| 5,203,245 | 4/1993 | Terpstra | 83/397 |
| 5,370,025 | 12/1994 | Itzov | 83/397 |
| 5,513,548 | 5/1996 | Gruglieri | 83/397 |
| 5,609,085 | 3/1997 | Chang | 83/397 |
| 5,638,731 | 6/1997 | Garuglieri | 83/397 |

*Primary Examiner*—Rinaldi I. Rada
*Assistant Examiner*—Boyer Ashley
*Attorney, Agent, or Firm*—Michael Best & Friedrich

[57] ABSTRACT

A cutting tool including a base having a turntable pivotally mounted on the base for movement about a vertical axis, a support member mounted on the turntable, and a saw arm mounted on the support member for pivotal movement about an axis between cutting and non-cutting positions. The saw arm has a saw blade including a lower portion. The saw blade is mounted for rotation about an arbor axis. A lower blade guard is supported on the saw arm for pivotal movement about the arbor axis between a surround position wherein the lower blade guard surrounds the lower portion of the saw blade and a non-surround position wherein the lower portion of the saw blade is exposed for cutting. The cutting tool also includes a cam plate mounted on the saw arm, and a cam follower mounted on the support member such that movement of the saw arm between the non-cutting position and the cutting position causes pivotal movement of the lower blade guard between the surround position and the non-surround position.

9 Claims, 9 Drawing Sheets

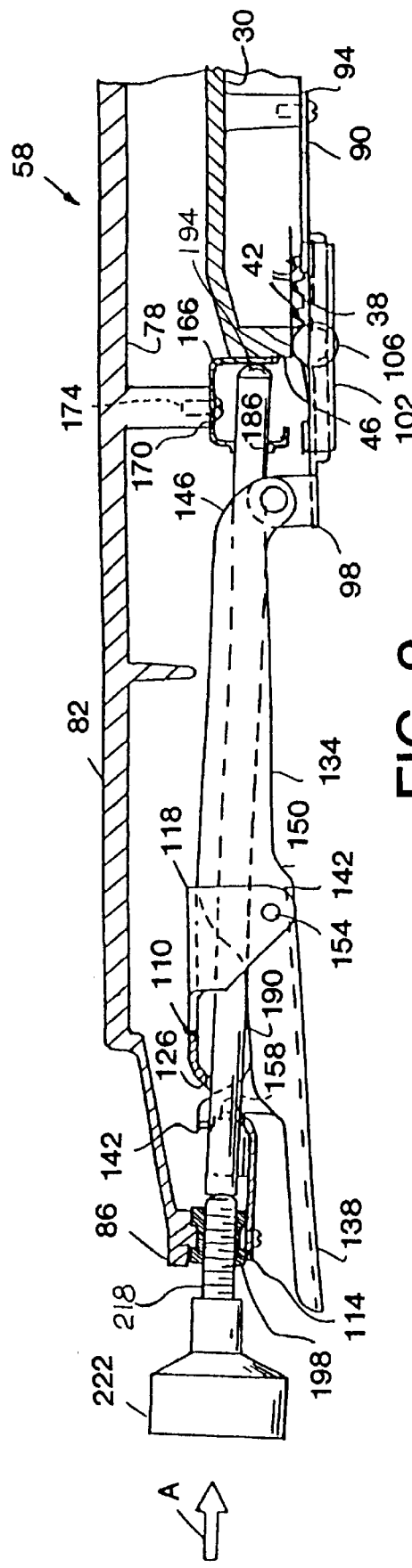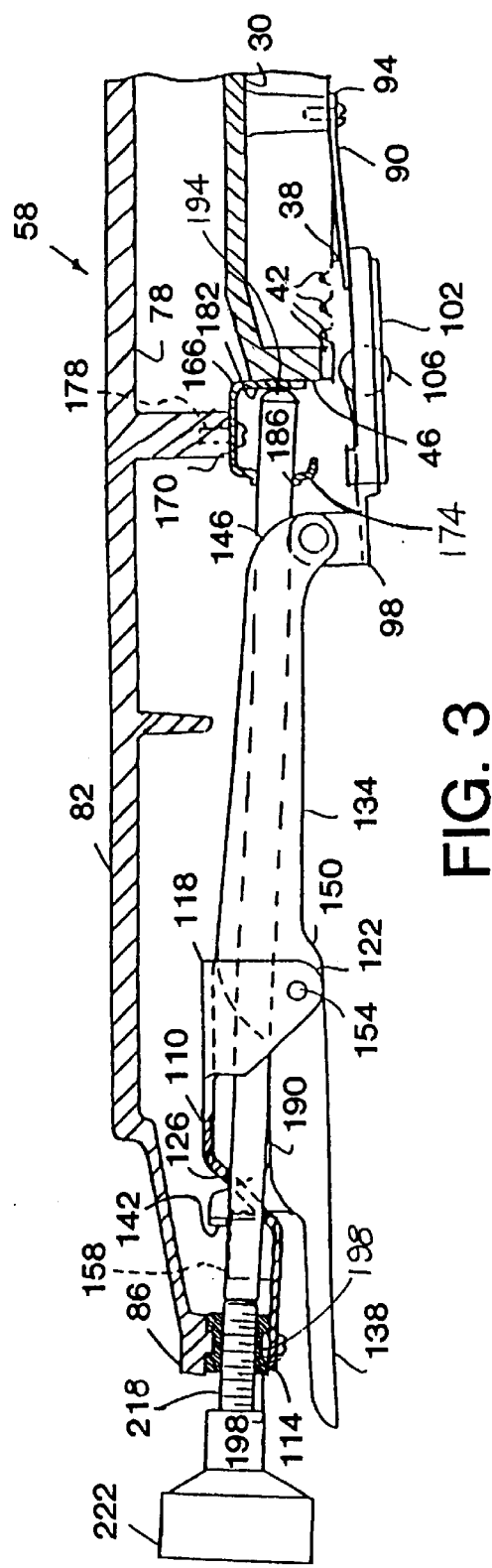

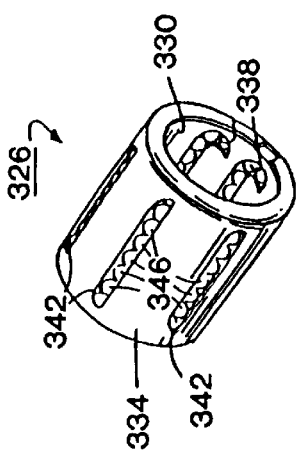
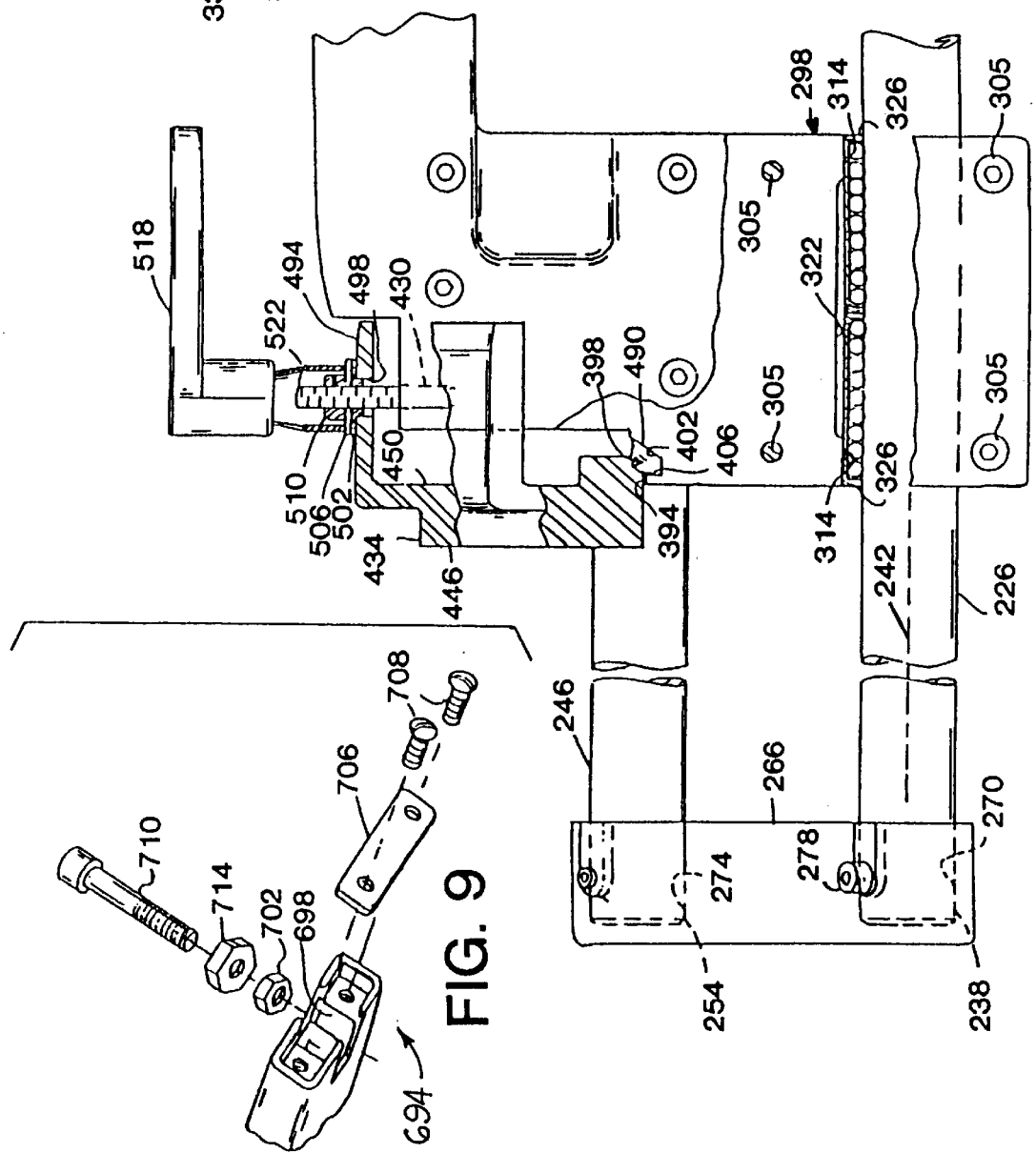

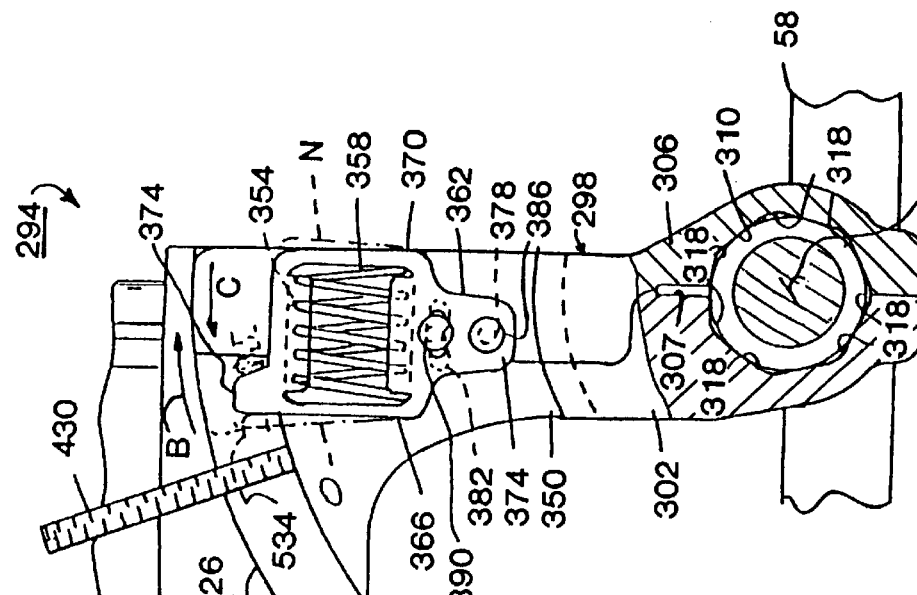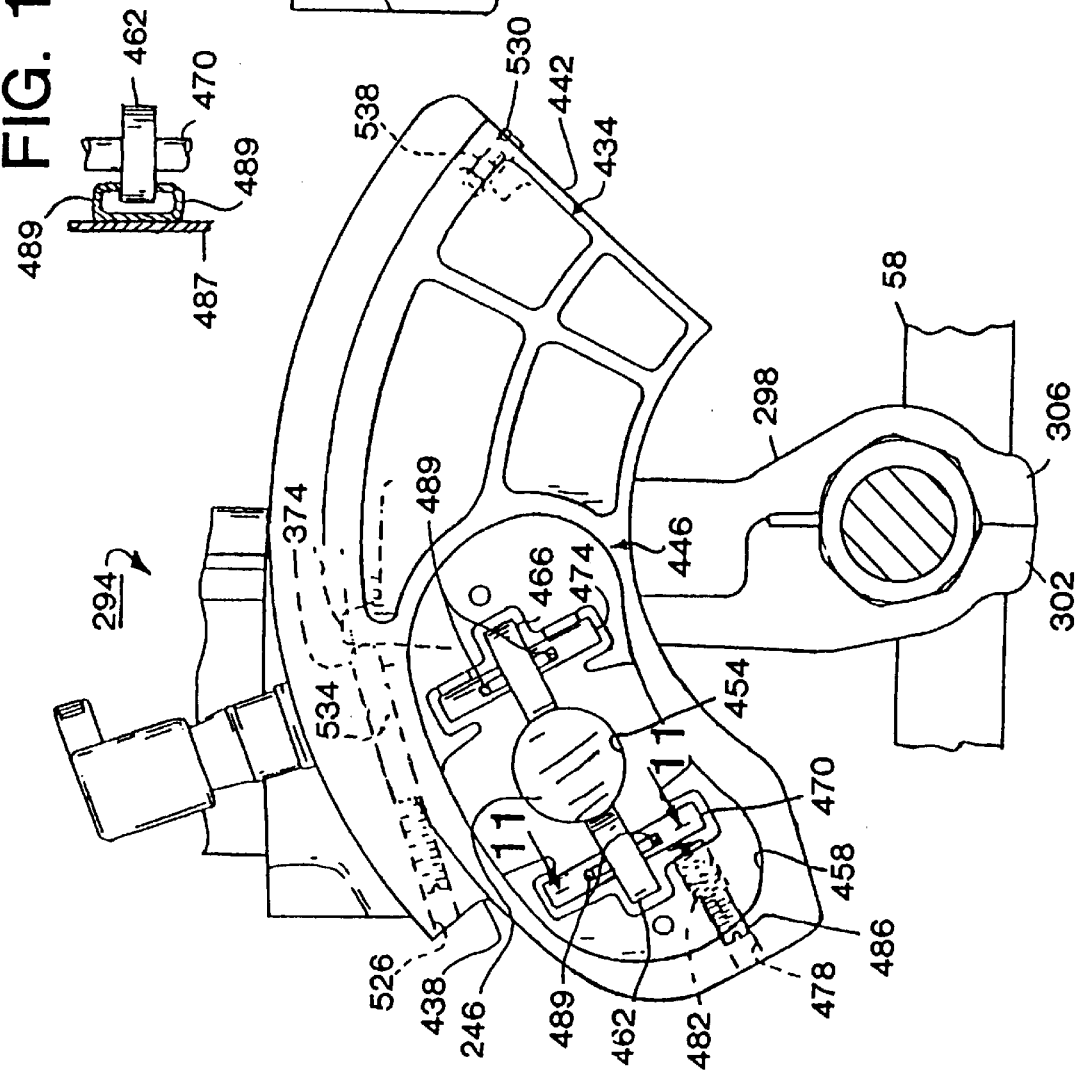

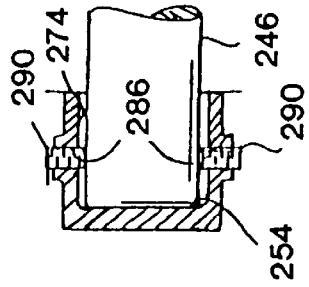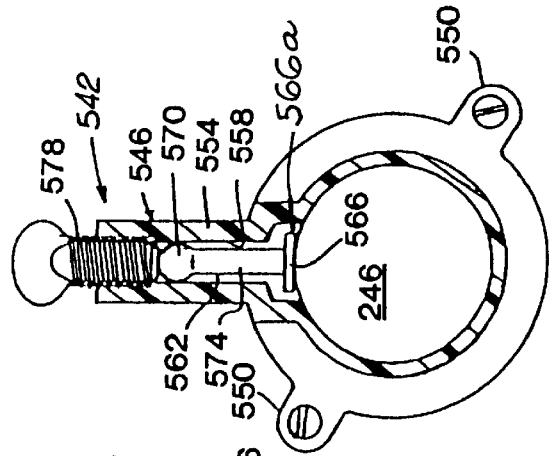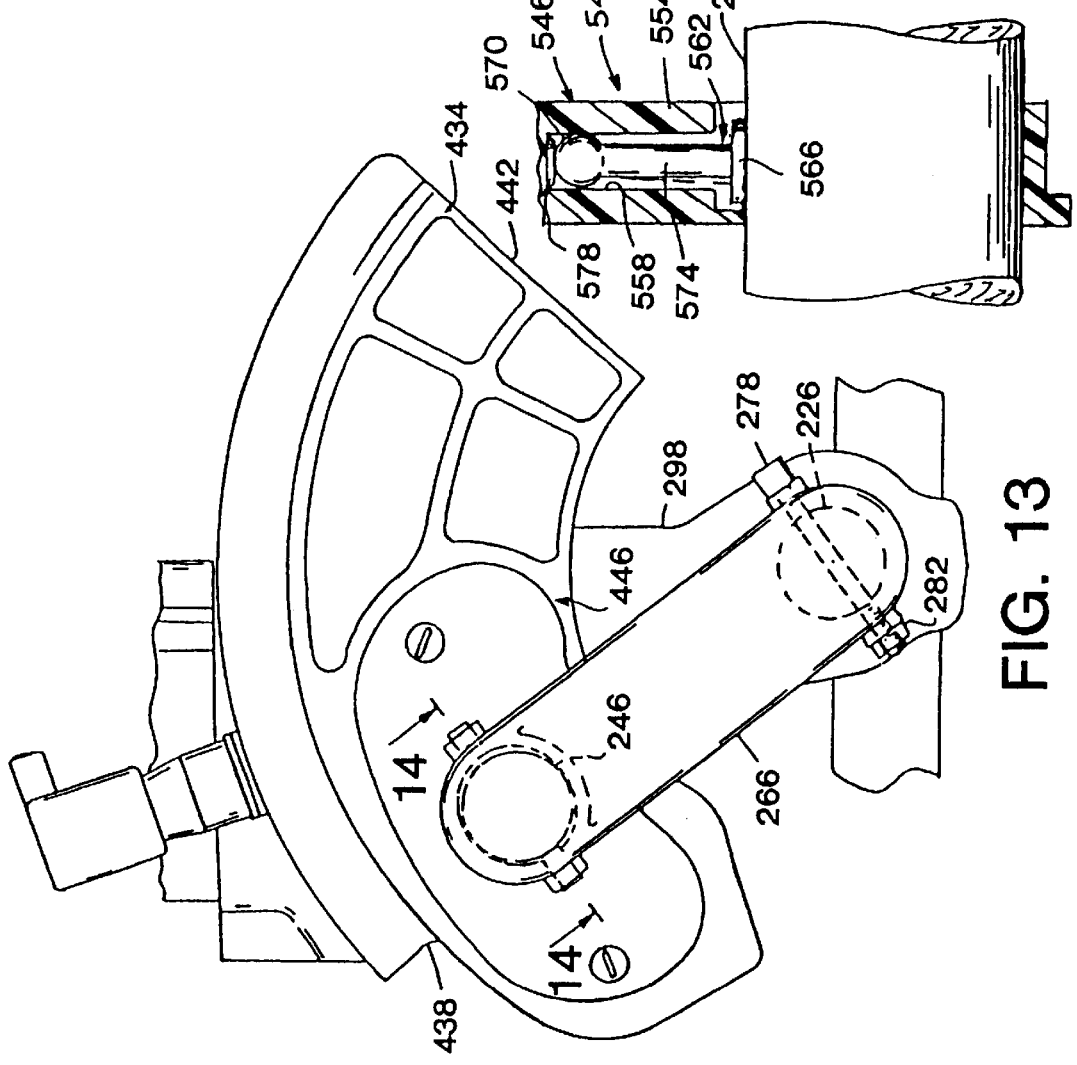

LOWER BLADE GUARD ACTUATING MECHANISM FOR A SLIDE COMPOUND MITER SAW

RELATED APPLICATION

This application claims the benefit under 35 U.S.C. §119 of co-pending United States Provisional patent application Ser. No. 60/002,134, filed Aug. 10, 1995.

BACKGROUND OF THE INVENTION

The invention relates to miter saws, and in particular, to a slide compound miter saw. It is commonly known in the art to include in a slide compound miter saw a base having a pedestal and a turntable mounted on the pedestal for pivotal movement about a vertical axis. The pedestal and turntable each include smooth upper surfaces that combine to form a continuous work piece support surface for supporting the work piece during cutting thereof. An elongated, vertical support fence is mounted on the support surface to provide additional support to the work piece. Typically, the turntable is adjustable to a plurality of predetermined positions that allow for relatively precise cutting at predetermined miter angles relative to the work piece support fence.

It is also known in the art to include a cutting unit mounted on the base and having a saw arm and a mounting arrangement for mounting the saw arm to the base to allow pivotal movement of the cutting unit about a first horizontal axis between a cutting position and a non-cutting position and about a second horizontal bevel angle axis to allow adjustment of the bevel angle of the saw unit so that compound cutting of the work piece can be achieved. The mounting arrangement of the slide compound miter saw typically allows sliding movement of the saw unit in the forward and rearward directions in order to accommodate or allow cutting of larger work pieces.

As shown in U.S. Pat. No. 5,146,825, one known slide compound miter saw includes a base having a turntable and a support member connected to the turntable. A pair of support rods are slidably mounted to the upper end of the support member and are fixed to the saw unit to allow the saw unit to slide relative to the work piece support surface.

Most miter saws also include a fixed or upper blade guard and a retractable lower blade guard. It is known in the art to include a mechanism that causes pivotal movement of the lower blade guard from a surround position to a non-surround position when the saw unit is lowered from a non-cutting position to a cutting position.

SUMMARY OF THE INVENTION

Known slide compound miter saws suffer from a number of deficits or disadvantages. First, the mechanism for allowing adjustment of the turntable about the vertical axis to the predetermined positions does not allow micro-angular adjustment relative to any such predetermined position in order to engage in cutting of a work piece at a miter angle that is not a true 15°, 30°, 45° or 60° angle.

Second, known slide mechanisms in slide compound miter saws require high tolerance bearings and are typically expensive and difficult to manufacture because of the complexity of the mechanism connecting the cutting unit to the base. The mechanism is complex because of the need to arrange for sliding movement of the cutting unit in the direction of the bevel angle axis, pivotal movement of the cutting unit about the bevel angle axis, and pivotal movement of the cutting unit about the horizontal axis between cutting and non-cutting positions.

Third, known slide compound miter saws currently do not provide a convenient means for adjusting the bevel angle beyond 0° (i.e., beyond a vertical position in the negative bevel angle direction) or in the opposite direction beyond 45° (in the positive bevel angle direction). The ability to conveniently adjust the bevel angle beyond 0° or beyond 45° allows cutting of the work piece at bevel angles that are not true 0° or 45° from vertical.

Moreover, known slide compound miter saws have lower blade guard actuating mechanisms that are complex and that do not prevent the saw arm from being lowered to the cutting position when the lower blade guard is manually pivoted to the non-surround position in order to change the saw blade or otherwise service the tool.

Accordingly, the invention provides a slide compound miter saw including a base having a pedestal and a turntable pivotally mounted on the pedestal for pivotal movement about a vertical axis. The miter saw also includes an index means for releasably securing the turntable in predetermined positions of angular adjustment about the vertical axis. The indexing means includes a plurality of detent receiving recesses positioned at predetermined positions about the periphery of the base. The turntable includes a handle and a detent mechanism mounted between the handle and the base. The detent mechanism includes a detent which is alignable by rotation of the turntable with any one of the recesses and a detent biasing spring which constantly biases the detent into the specific recess with which the detent is aligned. A detent override is provided that is selectively positionable to withdraw the detent from the recess and to free the turntable for micro-angular adjustment relative to any predetermined position. The miter saw also includes a locking mechanism for releasably securing the turntable in any selected position of micro-angular adjustment.

A cutting unit is mounted on the turntable for pivotal movement about a horizontal axis between a non-cutting position and a cutting position relative to the turntable and for pivotal movement about a second horizontal or bevel angle axis transverse to the first horizontal axis. The mechanism for mounting the cutting unit to the base includes a primary support shaft connected to the turntable and extending rearwardly from the turntable. An auxiliary shaft is connected to the primary shaft and to the turntable by a coupling and a mounting bracket, respectively. A bevel support including a pair of caged, linear roller bearings is mounted on the primary support shaft for sliding movement in the direction of the bevel angle axis. The bevel support is pivotally adjustable about the horizontal bevel angle axis which is coincident with the primary support shaft axis.

The bevel support includes a bearing surface. A wedge action clamp mechanism or auxiliary support is mounted on the auxiliary shaft to allow the cutting unit to be secured in any bevel angle position. The auxiliary support has a bearing surface and a clamp actuator for biasing the bearing surface of the auxiliary support against the bearing surface of the bevel support.

The bevel support includes an aperture and a helical spring held captive in the aperture by a spring clip pivotally mounted on the bevel support. The spring clip engages the auxiliary support and allows adjustment of the cutting unit about the bevel angle axis beyond the bevel angle position that is 45° from vertical and in one direction to a position 48° from vertical and beyond vertical in the opposite direction to a bevel angle position −3° from vertical.

The bevel support includes a bifurcated member or pair of devises. A saw arm is mounted between the devises and is fixed thereto by a hinge pin. A pair of compressible disk springs are mounted on the hinge pin to bias the bevel support and saw arm to an optimum axial position relative to one another.

The slide compound miter saw also includes a lower blade guard mounted on the cutting unit for movement between a saw blade surround position and a saw blade non-surround position when the cutting unit is moved from a non-cutting position to a cutting position. A linkage mechanism connects the lower blade guard to the bifurcated member to effect movement of the lower blade guard in response to movement of the cutting unit between the non-cutting position and the cutting position.

It is an advantage of the invention to provide a slide compound miter saw having a cutting unit support mechanism that is simple and cost effective to manufacture.

It is another advantage of the invention to provide a slide compound miter saw wherein the bevel angle axis is coincident with the primary support shaft of the cutting unit.

It is another advantage of the invention to provide a slide compound miter saw having a bevel angle adjustment mechanism allowing adjustment of the cutting unit about the bevel angle axis beyond the bevel angle position that is 45° from vertical and in one direction to a position 48° from vertical and beyond vertical in the opposite direction to a bevel angle position −3° from vertical.

It is another advantage of the invention to provide a slide compound miter saw having an indexing detent mechanism and an apparatus to override the indexing detent mechanism to allow micro-adjustment of the turntable relative to the preset angles.

It is another advantage of the invention to provide a locking mechanism in a slide compound miter saw to allow the turntable to be fixed in the position of micro-adjustment about the preset angles.

It is another advantage of the invention to provide a slide lock or stop mechanism for securing the cutting unit relative to the primary support shaft during transport of the miter saw.

It is another advantage of the invention to provide a depth stop on the saw arm of the cutting unit to allow adjustment of the cutting depth of the saw blade.

Various features and advantages of the invention are set forth in the following detailed description and claims.

BRIEF DESCRIPTION OF THE DRAWINGS

FIG. 2 is a partial cross-section of the base shown in FIG. 1.

FIG. 3 is a partial cross-section of the base shown in FIG. 1 and showing the detent in the detent withdrawal position.

FIG. 7 is a partial side view of the support mechanism shown in FIG. 6 with portions cut away.

FIG. 8 is a perspective view of a caged, linear bearing assembly of the support mechanism shown in FIG. 7.

FIG. 9 is an exploded view of a depth stop shown in FIG. 6.

FIG. 10 is a partial rear elevational view of the support mechanism of the miter saw shown in FIG. 6 with the roller bearing cover plate removed.

FIG. 11 is a partial cross-section taken along line 11—11 in FIG. 10.

FIG. 12 is a rear elevational view of the bevel support shown in FIG. 10 and mounted on the primary support shaft.

FIG. 13 is a partial rear elevational view of the cutting unit shown in FIG. 6.

FIG. 14 is a partial cross-section of the coupling taken along line 14—14 in FIG. 13.

FIG. 15 is a partial cross-section of the slide lock shown in FIG. 6.

FIG. 16 is a partial cross-section of the slide lock shown in FIG. 15 and showing, in phantom, the locked position of the slide lock.

Figure 1:
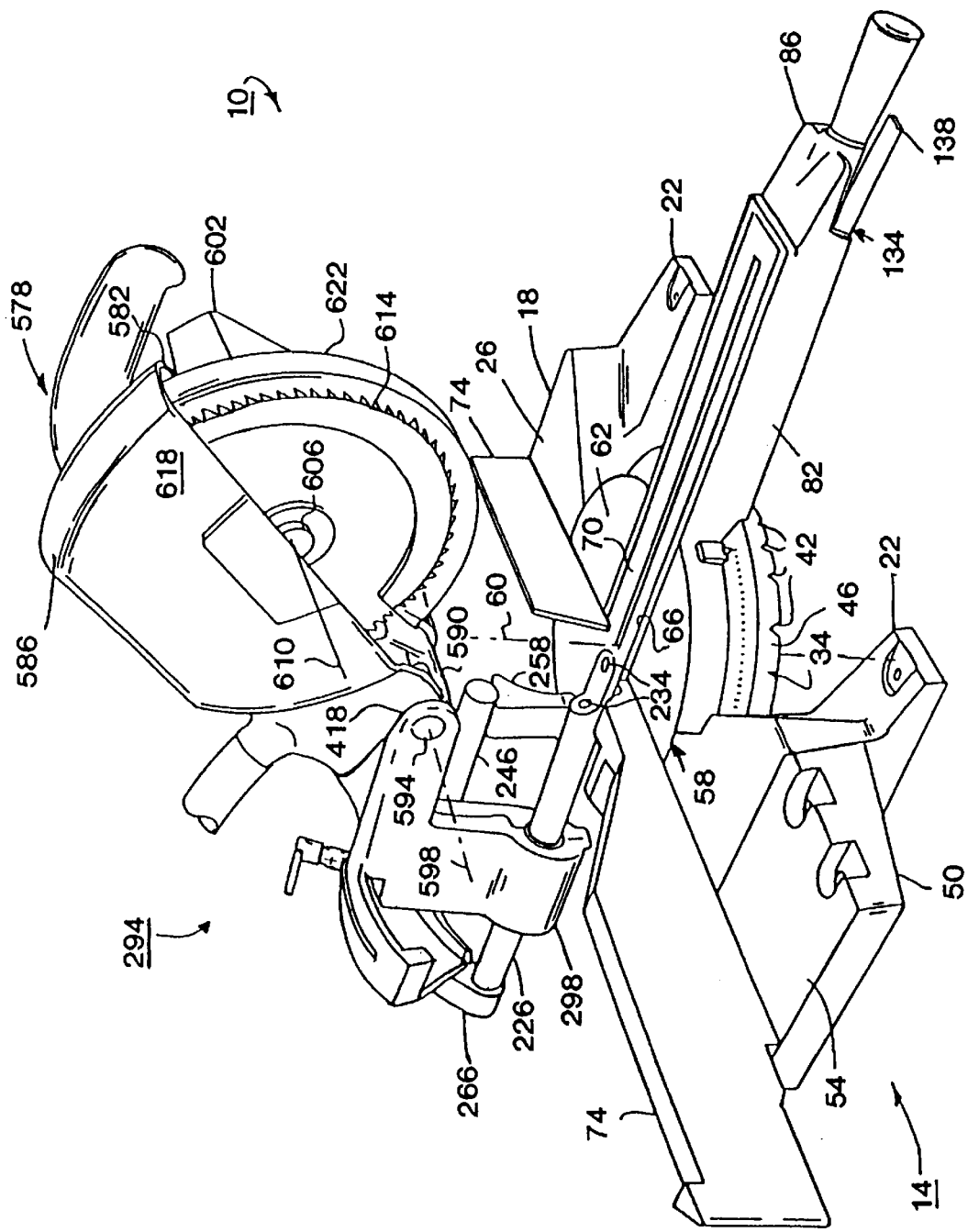
FIG. 1 is a perspective view of a slide compound miter saw embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DESCRIPTION OF THE PREFERRED EMBODIMENT

Shown in FIG. 1 of the drawings is a slide compound miter saw 10 embodying the invention. The slide compound miter saw 10 has a base 14. The base 14 includes a pedestal 18 having four feet 22 (only two of which are shown in FIG. 1) for supporting the miter saw 10 on a surface, an upper surface 26 and a lower surface 30 (FIGS. 2 and 3 only). The pedestal 18 also includes a peripheral edge 34 adjacent the front of the pedestal 18. The peripheral edge 34 includes a lower surface 38 (FIGS. 2 and 3 only) having a plurality of detent receiving recesses 42 and a forwardly facing bearing surface 46. A base extension 50 is mounted on the pedestal 18. The base extension 50 includes an upper surface 54.

Figure 4:
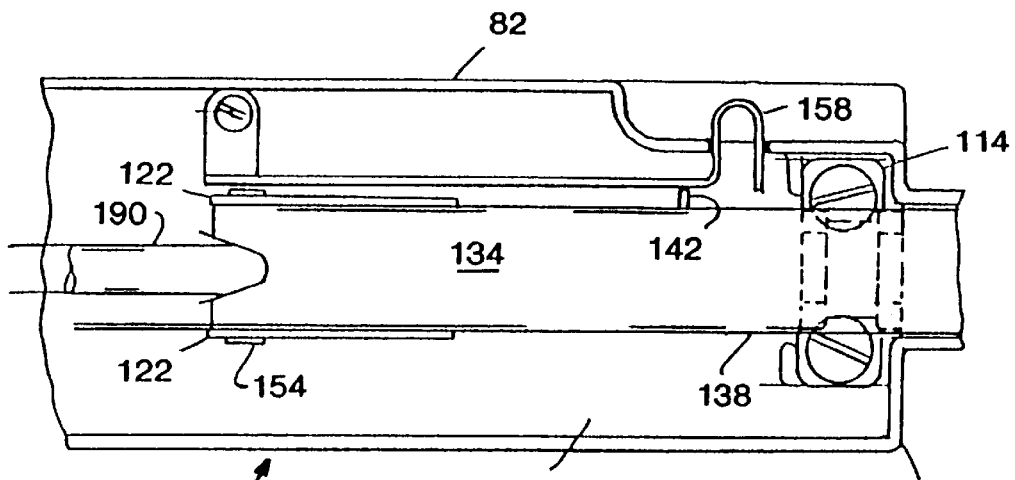
FIG. 4 is a partial bottom view of the indexing mechanism shown in FIGS. 2 and 3.

The base 14 includes a turntable 58 mounted on the pedestal 18 for pivotal movement about a vertical axis 60. The turntable 58 includes an upper surface 62. The upper surfaces 26, 54 and 62 of the pedestal 18, base extension 50 and turntable 58 together form a smooth, continuous work piece support surface for supporting a work piece during cutting thereof. The upper surface 62 of the turntable 58 has therein an aperture 66 and a kerf plate 70 is mounted in the aperture 66. The kerf plate 70 provides additional support to the work piece. Fence pieces 74 are mounted on the work piece support surface to provide further support to the work piece. The turntable 58 also includes a lower surface 78 (FIGS. 2–4) and a peninsular member 82 having an end portion 86, the peninsular member 82 projecting forwardly from the turntable and being integrally joined to the turntable.

As shown in FIGS. 2 and 3, a spring member 90 is connected to the bottom of the turntable 58. A similar spring member is shown and described in U.S. Pat. No. 5,249,496, which is incorporated herein by reference. The spring member 90 includes one end 94 connected to the lower surface 30 of the turntable 58 and includes an opposite end 98. The spring member 90 includes a center portion 102 between the ends 94 and 98 and a detent 106 is captured in the center portion 102. The spring member 90 is positioned so that the detent 106 is biased against the lower surface 38 of peripheral edge 34 such that when the detent 106 is in the vicinity of a detent receiving recess 42, the detent 106 is biased into the recess 42 to secure the turntable 58 in a particular position of adjustment with respect to the pedestal 18.

Figure 5:
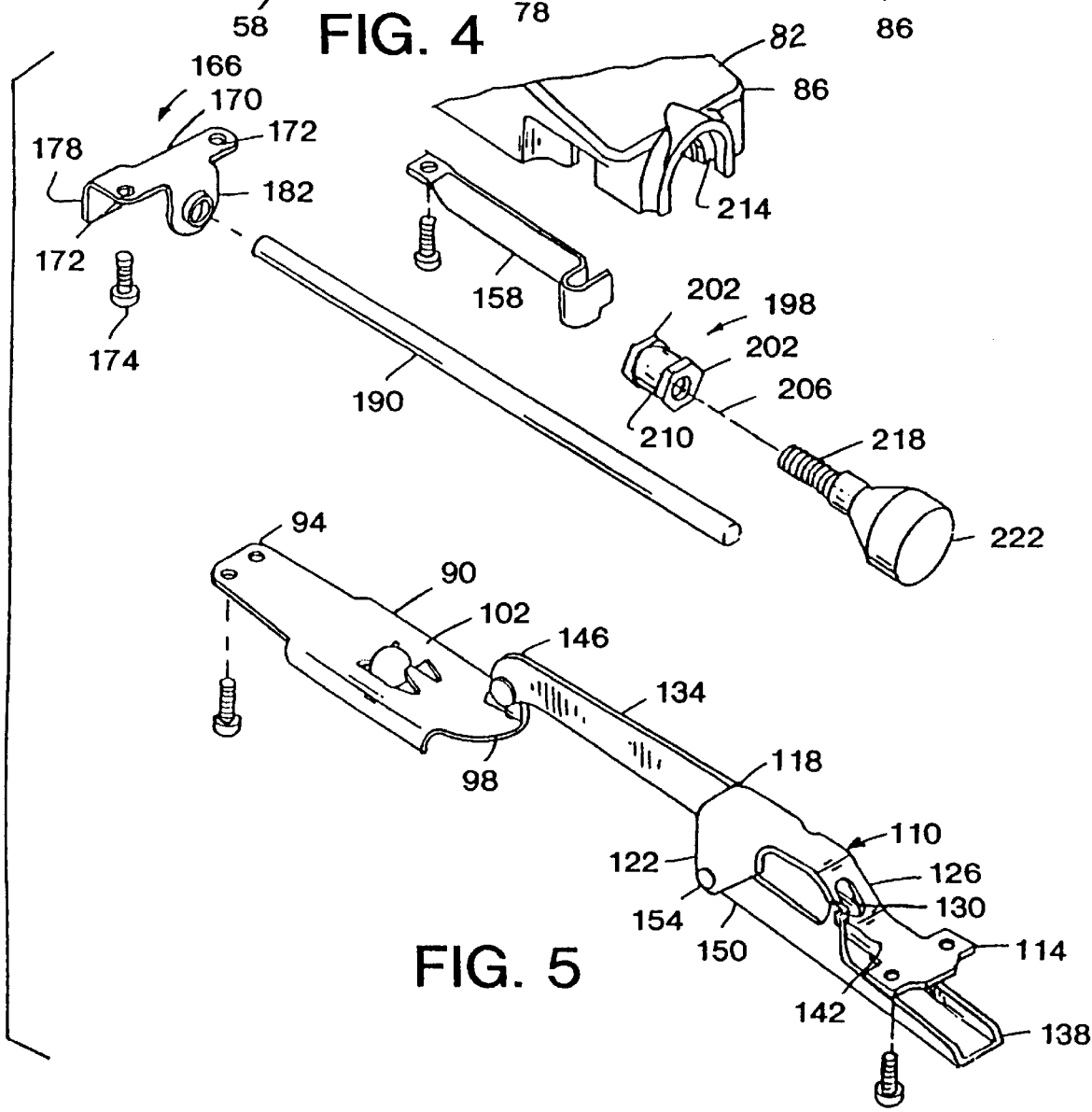
FIG. 5 is an exploded view of the indexing mechanism shown in FIG. 2 and 3.

The base 14 also includes a lever support 110 mounted beneath the lower surface 78 of the peninsular member 82. The lever support 110 includes opposite ends 114 and 118. The end 114 is connected beneath the lower surface 78 of the turntable 58 adjacent the end portion 86 of peninsular member 82, and the end 118 includes a pair of downwardly extending devises 122. The lever support 110 also includes a canted center portion 126 having an aperture 130 (FIG. 5) therein.

The base 14 also includes a lever 134. The lever 134 has a first end forming an actuating handle 138, a locking tab 142 on the actuating handle 138, a second end 146 pivotally connected to the opposite end 98 of the spring member 90, and a center portion 150. The center portion 150 is pivotally connected to the clevises 122 by a hinge pin 154 so that upward movement of the handle 138 causes downward movement of the second end 146 against the biasing force of the spring member 90 to release the detent 106 from the particular detent receiving recess 42 with which it is aligned thereby releasing the turntable 58 for pivotal movement about the axis 60 and, if necessary, for micro-angular adjustment about the detent receiving recess 42 with which the detent 106 was aligned. A flexible latch 158 (FIGS. 4 and 5) is mounted beneath the lower surface 78 of the turntable 58 on the peninsular member 82. The latch 158 receives the locking tab 142 on the lever 134 to secure the lever 134 in the detent withdrawal position. When the actuating handle 138 is raised to move the detent 106 to the detent withdrawal position, movement of the latch 158 toward the lever 134 causes locking engagement of the latch 158 with the locking tab 142 to secure the detent 106 in the detent withdrawal position and allow free pivotal movement of the turntable 58 relative to the pedestal 18.

The base 14 also includes a locking bracket 166 (FIGS. 2, 3 and 5) mounted beneath the lower surface 78 of the turntable 58. The locking bracket 166 includes a mounting portion 170 having spaced apertures 172 therein. A pair of threaded fasteners 174 (only one of which is shown) extend through the apertures and into the turntable 58 to secure the locking bracket 166 to the turntable 58. The locking bracket 166 also includes a friction extension 182 and a support extension 178 having therein an aperture 186. A bearing rod 190 extends through the aperture 130 of the lever support 110 and through the aperture 186 of the support extension 178 so that the bearing rod 190 is supported by the lever support 110 and the locking bracket 166 and so that one end 194 of the bearing rod 190 engages the friction extension 182.

The base 14 also includes a threaded nut 198 (FIG. 5) having hexagonally shaped ends 202, an axis 206 extending between the ends 202 and a cylindrical center portion 210. The nut 198 is mounted on the end portion 86 of the peninsular member 82 in an aperture 214 formed in the lower surface 78 of the turntable 58. The aperture 214 is saddle shaped and is contoured so as to prevent axial and rotational movement of the nut 198. A threaded rod 218 extends through the nut 198 and engages the bearing rod 190. A handle 222 is connected to the threaded rod 218 to facilitate rotation thereof to cause axial movement of the threaded rod 218 relative to the base 14. Axial movement of the threaded rod 218 in the direction of arrow A (FIG. 2) moves the end 194 of the bearing rod 190 against friction extension 182. Friction extension 182 in turn bears upon the bearing surface 46 of the pedestal 18 to fix the turntable 58 in place relative to the pedestal 18 regardless of the position of the detent 106 with respect to the lower surface 38 of the peripheral edge 34.

Figure 6:
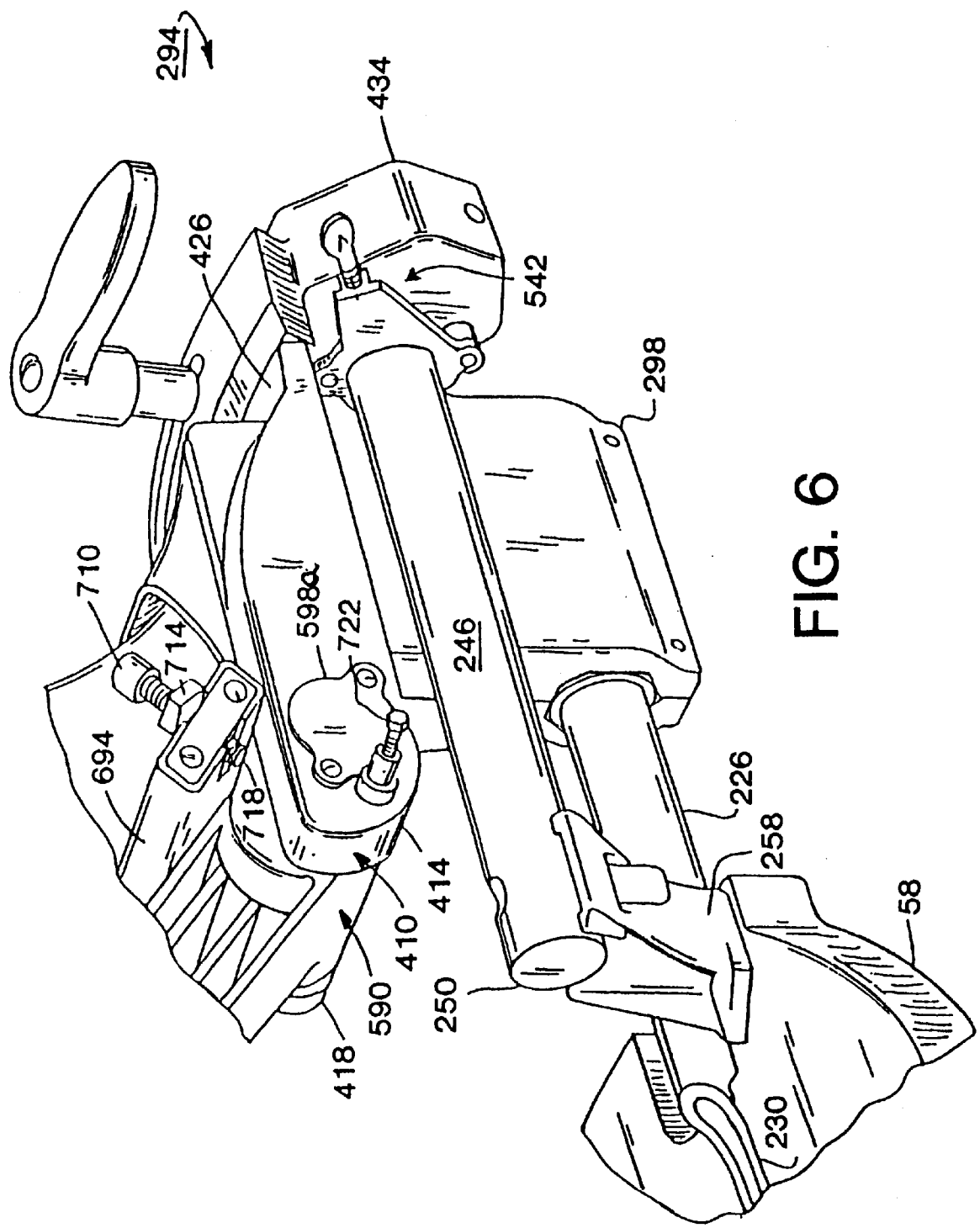
FIG. 6 is a partial perspective view of the cutting unit shown in FIG. 1 and showing the support mechanism for mounting the cutting unit on the turntable.

As best shown in FIGS. 1 and 6, the base 14 also includes a primary support shaft 226 mounted on the turntable 58. The primary support shaft 226 is a hardened heavy gauge chromed steel tube. At one end 230 of the primary support shaft 226, a portion of the tube is cut away to form a spoon shaped member having a pair of through-bores 234 (FIG. 1 only) therein. A screw (not shown) extends downwardly through each bore and into the upper surface 62 of the turntable 58 to secure the primary support shaft 226 to the turntable 58. The primary support shaft 226 also includes an opposite end 238 (shown in phantom in FIG. 7) and has an axis 242 (FIG. 7 only) extending between the ends 230 and 238. In the preferred embodiment, the axis 242 is coplanar with the upper surface 62 of the turntable 58.

The base 14 also includes an auxiliary support shaft 246 having opposite ends 250 (FIG. 6) and 254 (FIG. 14). The auxiliary support shaft 246 is a hardened chromed steel tube. A support member 258 and the end 250 of the auxiliary support shaft 246 are secured to the upper surface 62 of the turntable 58 adjacent the end 230 of the primary support shaft 226 by two fasteners (not shown) extending through the auxiliary support shaft 246 and the support member 258 and into the upper surface 62 of the turntable 58.

The end 238 of the primary support shaft 226 and the end 254 of the auxiliary support shaft 246 are connected together by a coupling 266 (FIGS. 7 and 13). The coupling 266 includes a precision bore 270 for receiving therein the end 238 of the primary support shaft 226 and a low tolerance bore 274 for receiving therein the end 254 of the auxiliary support shaft 246. Referring to FIGS. 7 and 13, a fastener 278 extends through the coupling 266 and through the end 238 of the primary support shaft 226 to secure the primary support shaft 226 in the precision bore 270. A nut 282 (FIG. 13 only) is threaded onto the bolt 278 to secure the bolt 278 to the coupling 266. As best shown in FIG. 14, the coupling 266 also includes a pair of opposing, threaded through-bores 286 communicating with the low tolerance bore 274. Set screws 290 are threaded into the bores 286, respectively, to secure the auxiliary support shaft 246 to the coupling 266 and allow adjustment of the position of the end 254 of the auxiliary support shaft 246 within the low tolerance bore 274 so that the coplanar and parallel relationship between the axis 242 of the primary support shaft 226 and the axis of the auxiliary support shaft 246 can be easily adjusted.

The slide compound miter saw 10 also includes a cutting unit 294 (FIG. 1). The cutting unit 294 includes a bevel support 298 mounted on the primary support shaft 226. As best shown in FIG. 12, the bevel support 298 has first and second support sections 302 and 306. The support sections 302 and 306 are connected together to form a longitudinally extending bore 310 through which the primary support shaft 226 extends. The bore 310 has a longitudinally extending axis and the sidewall of the bore 310 includes axially opposite end portions 314 (FIG. 7) each having seven longitudinally extending scallops 318 (FIG. 12) formed therein. The bore 310 also includes a generally smooth cylindrical center portion 322 having an inner diameter that is slightly larger than the inner diameter of the end portions 314.

The bore 310 houses a pair of caged, linear bearing assemblies 326 (FIG. 7) mounted between the primary support shaft 226 and the sidewall of the bore 310. As shown in FIG. 8, the bearing assemblies 326 are commercially available and the bearing assemblies 326 shown in the drawings are manufactured by INA Bearing Company, Inc., and are sold as model No. KH3050PP. The bearing assemblies 326 include an inner cylindrical housing portion 330 and an outer cylindrical housing portion 334 surrounding the inner cylindrical housing portion 330 to form a ball bearing cage therebetween. The inner cylindrical housing portion 330 has seven "C"-shaped bearing slots 338 (only two of which are shown in FIG. 8) formed therein and the outer cylindrical housing portion 334 has seven longitudinal return slots 342 (only three of which are shown in FIG. 8) formed therein. Ball bearings 346 are mounted between the housing portions 330 and 334 in an oval path or race that includes the "C"-shaped bearing slots on one side of the oval pathway and the longitudinal return slots on the other side of the pathway. Thus, the ball bearings 346 are exposed to the primary support shaft 226 and bear on the primary support shaft 226 through the "C"-shaped bearing slots and are exposed to and spaced from the sidewall of the bore 310 through the return slots. As the bevel support 298 slides along the primary support shaft 226, the ball bearings 346 move along the "C"-shaped bearing slots in a direction from one end of the bearing slots 338 to the other end, and return to the first end through the return slots 342. Because the bearing assemblies 326 are compressed between the support sections 302 and 306 adjacent the end portions 314 of the bore 310, the scallops 318 formed in the end portions 314 and the support sections 302 and 306 enhance the fit of the support sections around the bearing assemblies 326. The linear bearing assemblies 326 allow zero-axial clearance (i.e., at least a portion of the individual ball bearings engage the primary support shaft 326) and, through adjustment of the amount of compression between support sections 302 and 306, allow axial and pivotal movement of the cutting unit 294 relative to the primary support shaft axis 242.

In a preferred form of the invention the two support sections 302 and 306 are joined together by fasteners 305 (FIG. 7) so as to engage the bearing assemblies 326 therebetween. The material of the support sections, the configuration of the housing cavity for the bearing assemblies and gap 307 (FIG. 12) permit adjustment of the engagement of the bearing assemblies 326 by the two support sections. By adjusting or tightening fasteners 305 a zero-axial clearance can be provided between support sections 302 and 306, bearing assemblies 326 and shaft 226.

The bevel support 298 includes a rear surface 350 (FIG. 12) defining a rectangular aperture 354 (shown in phantom in FIG. 12). A spring 358 and spring clip 362 are connected to the rear surface 350 so that at least a portion of the spring 358 extends into the aperture 354 and is captured in place by cooperation between the spring clip 362 and the aperture 354. The spring clip 362 includes opposite arms 366 and 370, and a mounting tab 374 having therein a circular bore 378 and a slotted bore 382. A pair of screws 386 and 390 extend through the bores, 378 and 382, respectively, and into the bevel support 298 to secure the spring clip 362 to the bevel support 298 and allow pivotal motion of the clip 362 about the screw 386 within a range of freedom. The rear surface 350 also includes an arcuate shelf 394 forming a slot or groove 398 (FIG. 7) having a canted bearing surface 402 and a vertical bearing surface 406 opposite the tapered bearing surface 402. The bevel support 298 also includes a front surface 410 (FIG. 6) defining a pair of devises 414 and 418 and an aperture (not shown) therebetween, an upper surface 426 (FIG. 12) and a threaded bolt 430 extending into the upper surface 426.

The cutting unit 294 also includes an auxiliary support 434 (FIGS. 7, 10 and 13) mounted on the auxiliary support shaft 246. The auxiliary support 434 includes opposite side surfaces 438 and 442 (FIGS. 10 and 13 only), a rearward surface 446, a forward surface 450 (FIG. 7) and a through-bore 454 (FIG. 10) extending between the rearward surface 446 and the forward surface 450. The rearward surface 446 defines an aperture 458 communicating with the bore 454. Ball bearings 462 and 466 having axles 470 and 474, respectively, are mounted in the aperture 458 on radially opposite sides of the auxiliary support shaft 246. As shown in the drawings, the bearings 462 and 466 bear on the surface of the auxiliary support shaft 246 and roll relative to the surface of the auxiliary support shaft 246 to allow easy axial movement of the auxiliary support 434 relative to the auxiliary support shaft 246. The auxiliary support 434 includes a threaded bore 478 communicating between the side surface 438 and the aperture 458. A coil spring 482 is mounted in the bore 478 and secured in position within the bore 478 by set screw 486. Adjustment of set screw 486 changes the biasing force of the spring 482 on the bearing 462 to adjust the combined tension of the bearings 462 and 466 on the auxiliary support shaft 246. As shown in FIG. 11, the auxiliary support also includes a cover plate 487 mounted on rearward surface 446 to cover aperture 458. The cover plate 487 includes opposing arms 489 straddling the bearings 462 and 466 to provide additional support for the bearings 462 and 466.

As best shown in FIG. 7, the auxiliary support 434 also includes an arcuate ridge 490 having a surface complementary to the contour of the arcuate shelf 394 of the bevel support 298. The arcuate ridge 490 fits into the arcuate shelf 394 so that the bevel support 298 supports the auxiliary support 434 in a radially fixed position relative to the axis 242 of the primary support shaft 226 and relative to the axis of the auxiliary support shaft 246.

Also shown in FIG. 7, the auxiliary support 434 also includes an arcuate shelf 494 overhanging the bevel support 298. The arcuate shelf 494 has formed therein a slot 498 and the auxiliary support 434 is mounted on the bevel support 298 so that the threaded bolt 430 extends through the slot 498. A nylon washer 502, a steel washer 506 and a threaded nut 510 are mounted on the threaded stud 430 to secure the auxiliary support 434 to the bevel support 298. A handle 518 is indexably mounted to collar 522. Collar 522 is threaded onto the threaded stud 430. Collar 522 has an inner diameter larger than the outer diameter of the nut 510 and smaller than the outer diameter of the steel washer 506 is positioned so that turning the handle drives the collar 522 against the washers 502 and 506 and the shelf 494, which in turn forces the arcuate ridge 490 to bear against the bearing surfaces 402 and 406 and secure the auxiliary support 434 in a radially fixed position relative to the axis 242 of the primary support shaft 226. Referring to FIG. 10, a pair of threaded through-bores 526 and 530 are formed in the side surfaces 438 and 442, respectively, adjacent the arcuate shelf 494 and set screws 534 and 538, respectively, are threaded into the bores, 526 and 530.

The cutting unit 294 also includes a slide lock 542 (FIG. 6) mounted on the forward surface of the auxiliary support 434. The slide lock 542 prevents the cutting unit 294 from sliding axially on the support shafts 226 and 246 and, as shown in FIGS. 15 and 16, includes a retaining ring 546 having a pair of mounting tabs 550 for connecting the retaining ring 546 to the auxiliary support 434. The retaining ring 546 also includes an extension 554 having therein a through-bore 558 extending radially relative to the axis of the auxiliary support 434. A floating piston 562 is mounted in the bore 558. The piston 562 includes an end having a disk-shaped head 566, an opposite end having a round-head 570 smaller than the disk-shaped head 566, and a narrow center portion or shaft 574 extending between the heads 566 and 570. The shaft 574 has an outer diameter smaller than the inner diameter of the bore 558 and the end 566 has an outer diameter greater than the inner diameter of the bore 558. The slide lock 542 also includes a set screw 578 in the bore 558. Tightening of the set screw 578 forces the head 566 of piston 562 against the auxiliary support shaft 246. Any attempt to move the cutting unit 294 axially along the auxiliary support shaft 246 causes the piston 562 to tilt because of the ratio of the piston length to the diameter of head 566 (shown in phantom in FIG. 16). Because the linear distance from perimeter 562a edge of the disk-shaped head 566 to the head 570 is always greater than the distance from the center of the disk-shaped head 566 to the head 570, the tilting action of the piston drives or wedges the edge of the disk-shaped head 566 against the surface of the shaft 246 to prevent movement of the cutting unit 294 relative to the auxiliary support shaft 246.

Referring to FIG. 12, the bevel support 298 is freely pivotally movable about the bevel angle axis 242 between the vertical position wherein the cutting unit 294 is vertically oriented for conventional miter cutting of the work piece, and a transverse, 45° bevel angle position wherein the cutting unit 294 is at an angle of 45° from vertical. The spring 358 and spring clip 362 move with or "float" between the 0° (vertical) position and the 45° position, and does not aid or hinder movement of the support about the bevel angle axis 242. As shown in FIG. 10, when the cutting unit 294 is in the vertical position, the tab 374 on the spring clip 362 engages the set screw 534 to prevent the spring 358 from any additional counter-clockwise (in FIG. 10) rotation about the bevel angle axis 242. That is, the set screw 534, spring clip 362 and spring 358 provide a positive resistance, subject to the bias force of the spring 358, against over rotation of the cutting unit 294 (i.e., rotation beyond vertical to a negative bevel angle position (to the left in FIG. 12)). The cutting unit 294 is further manually adjustable about the bevel angle axis 242, beyond the vertical position and against the biasing force of the spring 358 so that the spring clip 362 is in position "N" (shown in phantom in FIG. 12) relative to the bevel support 298. When this occurs, the set screw 534 forces the tab 374 of the spring clip 362 in the direction of arrow B and against the biasing force of the spring 358. The cutting unit 294 is adjustable beyond vertical only as far as the available compression in the spring 358 allows. At this point, the spring 358 is compressed between the arm 366 of spring clip 362 and the right side wall of aperture 354. In the embodiment shown in the drawings, this occurs at approximately −3° from vertical.

Likewise, as shown in FIG. 12, when the cutting unit 294 is in the 45° bevel angle position, the tab 374 on the spring clip 362 engages the set screw 538 to prevent the spring 358 from any additional clockwise rotation (to the right in FIG. 12) about the bevel angle axis 242. In this position, the set screw 538, spring clip 362 and spring 358 provide a positive resistance against rotation of the cutting unit 294 beyond the 45° bevel angle position. The cutting unit 294 is also further manually adjustable beyond the 45° bevel angle position and against the biasing force of the spring 358 to a position where the cutting units is approximately 480 from the vertical position. When this occurs, the set screw forces the tab 374 of the spring clip 362 in the direction of arrow C and against the biasing force of the spring 358 so that the spring clip 362 is in position "0" (shown in phantom in FIG. 12) relative to the bevel support 298. The cutting unit 294 is adjustable beyond 45° from vertical only as far as the available compression in the spring 358 allows. At this point, the spring 358 is compressed between the arm 370 of spring clip 362 and the left side wall of aperture 354.

As best shown in FIG. 1, the slide compound miter saw 10 also includes a saw arm 578 having housing halves 582 and 586 and including a hinge portion 590 connected between devises 414 and 418 by a hinge pin 594. A similar hinge pin and mounting arrangement is shown and described in U.S. Pat. No. 5,265,511, which is incorporated herein by reference. The hinge pin 594 has an axis 598 and the saw arm 578 is pivotal about the hinge pin axis 598 between a cutting position and a non-cutting position. The hinge pin 594 is fixed to the saw arm 578 by a two fasteners (not shown) and a pair of disk springs (also not shown) are mounted between the hinge pin 594 and the clevis 414. The hinge pin 594 is forced against the bias force of the disk springs into a predetermined position by a cover plate 598a (FIG. 6).

Still referring to FIG. 1, the saw arm 578 includes a saw motor 602 including an arbor 606 having an arbor axis 610. Energization of the motor 602 causes rotation of the arbor 606 about the arbor axis 610. The saw blade 614 is mounted on the arbor 606 for rotation therewith and the two-piece housing forms an upper blade guard 618 to cover the upper portion of the saw blade 614.

The saw arm 578 also includes a lower blade guard 622 and an actuating linkage connected to the lower blade guard 622 to move the lower blade guard 622 from a blade surround position when the cutting unit 294 is in the non-cutting position to a blade non-surround position (exposing the saw blade 614 for cutting) when the cutting unit 294 is in the cutting position. The lower blade guard of the preferred embodiment is shown and described in U.S. Pat. No. 5,370,025, which is incorporated herein by reference.

Figure 17:
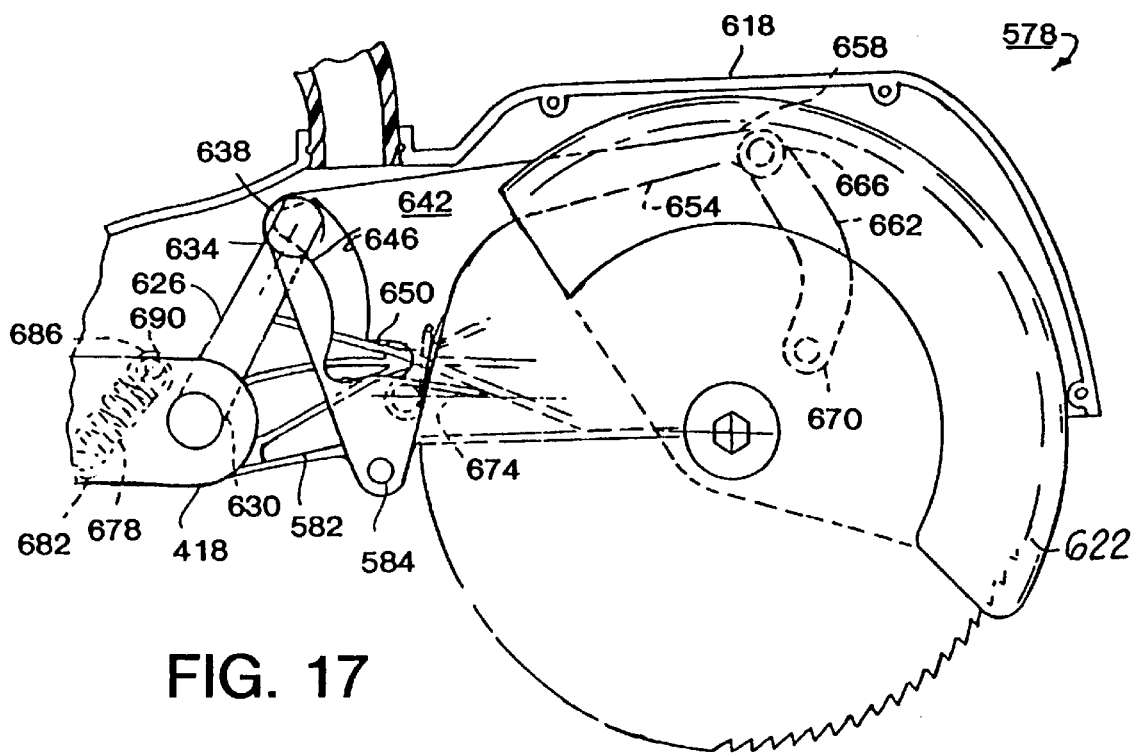
FIG. 17 is a partial cut away view of the cutting unit of the saw shown showing the saw arm in the cutting position.
Figure 18:
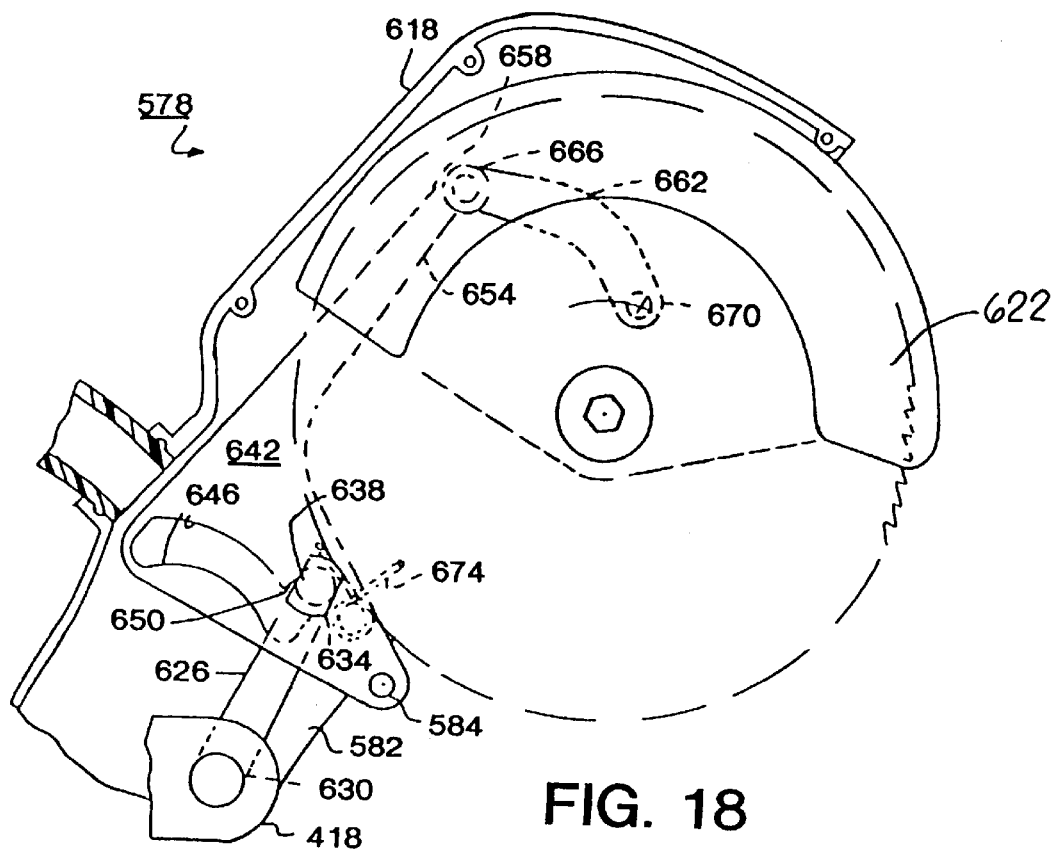
FIG. 18 is a view similar to FIG. 17 and showing the saw arm in the non-cutting position and the lower blade guard manually rotated to the non-surround position to allow removal of the saw blade.
Figure 19:
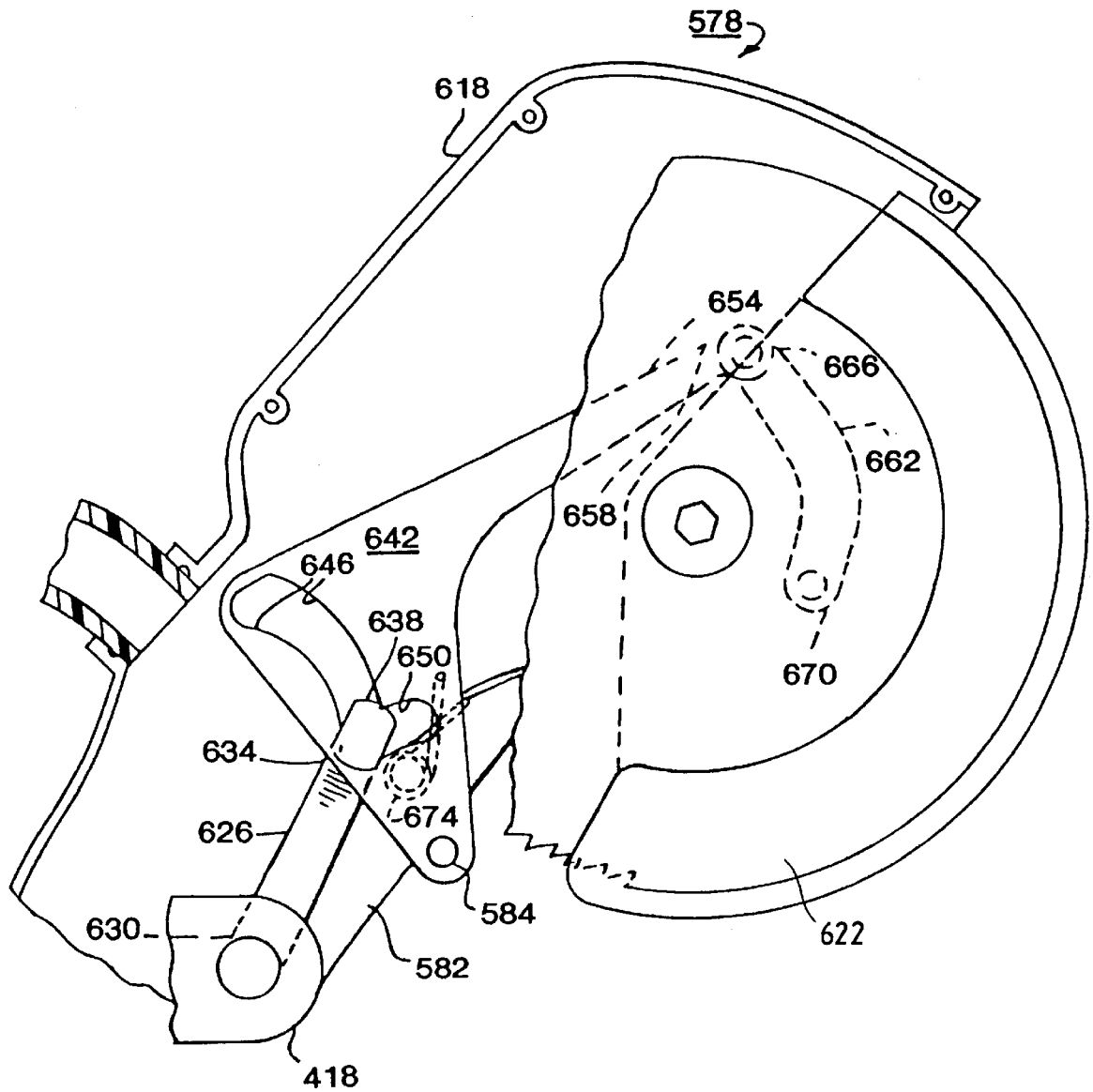
FIG. 19 is a view similar to FIGS. 17 and 18 and showing the saw arm in the non-cutting position.

Referring to FIGS. 17–19, the linkage includes a cam follower support member 626 having one end 630 connected to the clevis 418 and an opposite end 634 supporting a cam follower 638. The linkage also includes a cam plate 642 pivotally connected to the housing half 582 at hinge pin 584. The cam plate 642 includes a cam surface 646, a lost motion or a lockout surface 650 and a link arm 654 having an end portion 658. The linkage also includes a link member 662 having one end 666 pivotally connected to the end portion 658 of link arm 654 and having an opposite end 670 pivotally connected to the lower blade guard 622 at a point offset from the arbor axis 610. A torsional spring 674 is connected between the housing half 582 and the cam plate 642 to constantly bias the lower blade guard 622 toward a surround position wherein the lower blade guard 622 surrounds the lower portion of the saw blade 614.

The cutting unit 294 includes a pair of coil springs 678 (only one of which is shown in phantom in FIG. 17). Each spring 678 has one end 682 connected to the bevel support 298 and an opposite end 686. A support rod 690 extends between the housing halves 582 and 586 of the saw arm 578, and the ends 686 of springs 678 are connected to the support rod 690. The coil springs 678 provide a biasing force to bias the saw arm 578 to the non-cutting position.

Referring to FIGS. 6 and 9, the saw arm 578 also includes an extension 694 adjacent the clevis 414. As best shown in FIG. 9, the extension 694 has a centrally located saddle 698 and includes a hexagonal nut 702 mounted in the saddle 698. A cover plate 706 is mounted on the extension 694 by screws 708 to cover the saddle 698 and the nut 702 and secure the nut 702 in place in the saddle 698. A set screw 710 having a depth adjustment nut 714 threaded thereon is threaded into the nut 702 so that, when the cutting unit 294 is lowered to the cutting position, the end 718 of the set screw 710 engages the clevis 414 to limit the downward travel of the saw arm 578 and the depth to which the saw blade 614 travels into the work piece and through the kerf plate 70.

The slide compound miter saw 10 also includes a locking fastener 722 extending through the clevis 414. The locking bolt 722 is moveable from a withdrawn position allowing free movement of the saw arm 578 about the hinge pin to a locked position securing the saw arm 578 in the cutting position for transport of the slide compound miter saw 10.

In operation, the locking bolt 722 is withdrawn to the release position allowing the saw arm 578 to be raised to the non-cutting position. The set screw 710 and depth adjustment nut 714 are adjusted to the appropriate cutting depth and the work piece (not shown) is placed against the fence pieces 74 on the work piece support surface.

If the saw blade 614 needs to be changed for the particular application, the lower blade guard 622 is manually rotated to the non-surround position with the cutting unit 294 still in the non-cutting position. This causes cam follower 638 to engage lockout surface 650 thereby preventing lowering of the saw arm 578 while the lower blade guard 622 is in the non-surround position. When the blade change is complete, the lower blade guard 622 is released and pivots back to the surround position under the influence of the biasing force of spring 674.

If it is necessary to change the miter angle (i.e., the rotational position of the turntable 58 with respect to the pedestal 18 about the axis 60), the end 138 of the lever 134 is pulled upward to overcome the biasing force of the spring 90 and remove the detent 106 from the surface of the peripheral edge 34 of pedestal 18. The turntable 58 is then free to pivot about the axis 60 to any desired position of adjustment. In particular, if it is desired to position the turntable 58 in one of the predetermined positions of adjustment established by the detent receiving recesses 42, then the peninsular member 82 is pushed to align the turntable 58 so that the detent 106 is in the general vicinity of the desired detent receiving recess 42 and the lever 134 is released to allow the detent 106 to come to rest in the detent receiving recess 42. As long as the detent 106 is at least over one of the edges of the detent receiving recess 42, the biasing force of the spring will drive the detent 106 fully into the recess 42 and force alignment of the turntable 58 to the predetermined position. If it is desired to adjust the miter angle to a position other than any of the predetermined positions, then the threaded rod 218 is tightened against the bearing rod 190 to jam the friction extension 178 against the bearing surface 46 to lock the turntable 58 in place relative to the pedestal 18 before the lever 134 is released.

If it is desired to engage only in conventional miter cutting of a work piece, the cutting unit 294 is positioned as shown in FIG. 1 so that the cutting unit 294 is in the vertical position. In this position, if necessary, the handle 518 can be turned to release the bevel support 298 from the auxiliary support 434 to allow adjustment of the cutting unit 294 beyond vertical to a position between vertical and a −3° bevel angle position. When the saw is in the appropriate position, as indicated by the bevel angle axis indicator (not shown), the handle 518 can be tightened to secure the housing and the cutting unit 294 in the correct position. When the handle 518 is loosened, and when in an overturned position, the cutting unit 294 will return under the influence of the biasing force of the spring to the vertical position and the cutting unit 294 may then be adjusted between the vertical and 45° bevel angle position to allow compound miter cutting of the work piece.

If it is desired to cut the work piece at angles of greater than 45°, i.e., 45°–48° from vertical, then the cutting unit 294 is first positioned in the 45° bevel angle position and is forced against the biasing force of the spring 358 to the desired bevel angle position. When the desired position is reached, the handle 518 can be tightened to secure the bevel support 298 relative to the auxiliary support 434 thereby securing the cutting unit 294 in the correct bevel angle position. When the handle 518 is again loosened, the cutting unit 294 will return, under the influence of the biasing force of the spring, to the 45° bevel angle position and the cutting unit 294 is again freely adjustable between the 45° bevel angle position and the vertical position.

As the saw arm 578 is lowered to cut the work piece, the cam follower 638 moves along the cam surface 646 and causes pivotal movement of the cam plate 642 against the biasing force of the spring 674 and about the pivot axis. The pivotal movement of the cam plate 642 causes rotation of the lower blade guard 622 about the arbor axis 610 so that the lower blade guard 622 retracts within the housing from the saw blade surround position to a saw blade non-surround position.

Various features of the invention are set forth in the following claims.

The invention claimed is:

1. A cutting tool comprising:

a base;

a main support member mounted on said base;

a saw arm mounted on said main support member for pivotal movement about an axis between a cutting position and a non-cutting position, said saw arm having a saw blade including a lower portion and being mounted for rotation about an arbor axis, and having a lower blade guard supported for pivotal movement about said arbor axis, said lower blade guard being freely manually rotatable from a surrounding position, wherein the lower blade guard surrounds the lower portion of the saw blade, to a non-surrounding position, wherein the lower portion of the saw blade is exposed; and an actuating linkage for causing movement of the lower blade guard between said surrounding position and said non-surrounding position in response to movement of said saw arm between said non-cutting and said cutting positions, respectively, said actuating linkage including a cam plate pivotally mounted on said saw arm, said cam plate having a first cam plate end portion pivotally interconnected to said lower blade guard and a cam surface, and a cam follower support member fixed to said main support member and including a cam follower positioned to engage said cam surface.

2. A cutting tool as set forth in claim 1 wherein said cam plate includes means for preventing movement of said saw arm from said non-cutting position whenever said lower blade guard is manually rotated to said non-surrounding position.

3. A cutting tool as set forth in claim 1 wherein said support member includes a hinge pin and a hinge portion having a clevis and wherein said saw arm is connected to said clevis by said hinge pin.

4. A cutting tool as set forth in claim 1 wherein said cam plate has a second end portion and said actuating linkage further includes a link member having a first end pivotally connected to said cam plate second end portion and a second end pivotally connected to said lower blade guard.

5. A cutting tool as set forth in claim 1 wherein said cam plate includes a lockout surface, said cam follower being engageable with said lockout surface when said lower blade guard is manually moved to said non-surround position so as to prevent movement of said saw arm unit from said non-cutting position.

6. The cutting tool as set forth in claim 1, wherein said cam plate includes an opening, said cam surface being defined by at least a portion of said opening.

7. A cutting tool as set forth in claim 1 wherein said saw arm includes a first spring biasing said lower blade guard to said surrounding position, and a second spring biasing said saw arm to said non-cutting position.

8. A cutting tool as set forth in claim 7 wherein said first spring is a torsional spring connected between said saw arm and said cam plate and said second spring is a coil spring connected between said support member and said saw arm.

9. A cutting tool comprising:

a base;

a main support member mounted on said base, said main support member including a hinge portion having a clevis and a hinge pin;

a saw arm connected to said clevis by said hinge pin for pivotal movement about an axis between a cutting position and a non-cutting position, said saw arm having a saw blade mounted for rotation about an arbor axis and a lower blade guard supported for pivotal movement about said arbor axis, wherein said saw blade includes a lower portion and said lower blade guard is manually rotatable from a surrounding position, wherein said lower blade guard surrounds said lower portion of said saw blade, to a non-surrounding position, wherein said lower portion of said saw blade is exposed; and an actuating linkage for causing movement of said lower blade guard between said surrounding position and said non-surrounding position in response to movement of said saw arm between said non-cutting and said cutting positions, respectively, said actuating linkage including a cam plate mounted on said saw arm and having an opening therethrough, wherein at least a portion of said opening defines a cam surface including a lockout surface;

a link member having a first end pivotally connected to said cam plate and a second end pivotally connected to said lower blade guard, and a cam follower support member pivotally mounted to said main support member and including a cam follower engageable with said cam surface, said cam follower being engageable with said lockout surface when said lower blade guard is manually moved to said non-surround position so as to prevent movement of said cutting unit from said non-cutting position;

a torsional spring connected between said saw arm and said cam plate, and positioned to bias said lower blade guard toward said surrounding position; and a coil spring connected between said support member and said saw arm, and positioned to bias said saw arm toward said non-cutting position.

* * * * *